Feb. 15, 1966 Z. TARCZY-HORNOCH 3,235,796
FREE RUNNING MULTI-STABLE STATE CIRCUIT FOR TIME INTERVAL MEASUREMENT
Filed Sept. 4, 1962 4 Sheets-Sheet 1

INVENTOR.
Zoltan Tarczy-Hornoch
BY Flehr & Swain
Attorneys

INVENTOR.
Zoltan Tarczy-Hornoch
BY
Flehr and Swain
Attorneys.

Feb. 15, 1966 Z. TARCZY-HORNOCH 3,235,796

FREE RUNNING MULTI-STABLE STATE CIRCUIT FOR TIME INTERVAL MEASUREMENT

Filed Sept. 4, 1962

4 Sheets-Sheet 3

INVENTOR.
Zoltan Tarczy-Hornoch
BY [signature]
Attorneys

INVENTOR.
Zoltan Tarczy-Hornoch
BY Fehr & Swain
Attorneys

United States Patent Office 3,235,796
Patented Feb. 15, 1966

3,235,796

FREE RUNNING MULTI-STABLE STATE CIRCUIT FOR TIME INTERVAL MEASUREMENT

Zoltan Tarczy-Hornoch, Berkeley, Calif., assignor to W. K. Rosenberry, doing business as Able Research Lab., Berkeley, Calif.

Filed Sept. 4, 1962, Ser. No. 221,668
19 Claims. (Cl. 324—68)

This application is a continuation-in-part of application Serial No. 31,102, filed May 23, 1960, now U.S. Patent No. 3,105,195.

This invention relates to multi-stable state circuits and more particularly to circuits of this type which are free running but can be started and stopped in any of its stable states.

In the past in making digital time interval measurements an oscillator or a clock generator was used as the time reference. The oscillator was connected to a counting unit which often was a decimal counting unit through an AND gate. The time interval measurement is accomplished by opening the AND gate for the duration of the time interval in question and the decimal counting unit counts the clock pulses during this time interval. Making time interval measurements in this manner has two limitations. One limitation is that the oscillator frequency and therefore the resolution of the time interval measurement is limited by the resolution of the counting unit which is usually limited by the resolution of the first binary circuit. The second limitation is that the time interval measurement has a plus or minus one count ambiguity because the oscillator frequency is not phase locked to the start pulse. This is because the start pulse can come any time between two clock pulses and this creates the ambiguity.

In general, it is an object of the invention to provide a multi-stable state circuit which overcomes the above named limitations.

Another object of the invention is to provide a multi-stable state circuit of the above character in which the resolution is not limited by the resolution of the counting unit.

Another object of the invention is to provide a circuit of the above character which is phase locked to the start pulse regardless of when the start pulse arrives.

Another object of the invention is to provide a circuit of the above character which is particularly adapted for use in making digital time interval measurements.

Another object of the invention is to provide a circuit of the above character which is particularly adapted for digital delay generation.

Another object of the invention is to provide a circuit of the above character in which the start input can be eliminated and the stop input can be utilized as the start and stop input.

Another object of the invention is to provide a circuit of the above character which is stabilized in frequency.

Another object of the invention is to provide a circuit of the above character in which one stage is frequency stabilized to stabilize all of the stages.

Additional objects and features of the invention will appear from the following description in which the preferred embodiments have been set forth in detail in conjunction with the accompanying drawings.

Referring to the drawings:

FIGURE 1, parts A through F show a plurality of diagrams illustrating the principle of operation of my multi-stable state circuit.

In general, the present invention consists of a multi-stable state circuit which is particularly adapted for making short time interval measurements. It consists of a plurality of cascaded or serially connected binaries in which the output of the last binary in the cascade is connected to the input of the first binary in the cascade. Gates are connected to the inputs of the binaries so that the multi-stable state circuit can be utilized for making short interval time measurements.

Figure 1:
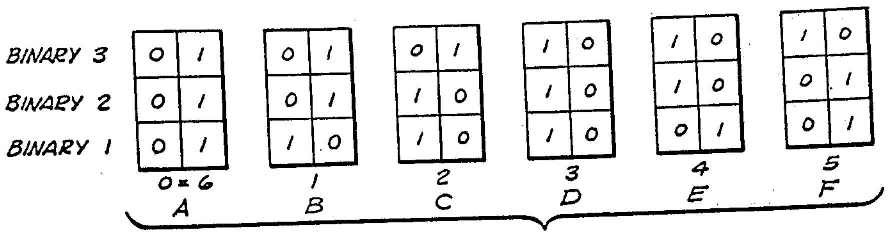

In FIGURE 1, I have shown diagrams illustrating the principle of operation of a multi-stable state circuit which is comprised of three binaries. As is well known to those skilled in the art, a binary is a bistable device which has two stable states.

The number of stable states possible with a given number of binaries in my multi-stable state circuit is given by the formula below $$S=2n$$

where S is equal to the number of stable states, and where $n$ is equal to the number of binaries. Thus, where three binaries are utilized as in the embodiment shown in FIGURE 1, six stable states are possible. These six stable states are shown in the various diagrams in FIGURE 1. When the binary consists of a conventional vacuum tube circuit comprised of two tubes, a binary is in one stable state when one tube is conducting and the other tube is not conducting and is in the other stable state when said one tube is not conducting and the other tube is conducting. In FIGURE 1, conventional designations are utilized to indicated the conducting and nonconducting sides of the binaries. Thus, since the conducting sides represent a 1 and the nonconducting sides represent a 0, they bear the respective binary notations of 1 and 0.

When the device is at rest or in a reset position, the binaries are connected in such a manner that all of the B sides of the binaries are conducting and the A sides are nonconducting as shown in FIGURE 1A. This block is designated as the zero or number 6 block. Upon application of a pulse to the first binary of the device in the state shown in FIGURE 1A, binary 1 is transferred to its other stable state as indicated by the block diagram in FIGURE 1B and designated as number 1 block. Thereafter if the device is connected to operate as a time interval measuring device, the transfer of the first binary to its second or other stable state would cause the second binary to transfer to its second stable state as shown in FIGURE 1C. Transfer of the second binary to its second stable state would then cause transfer of the third binary to its second stable state as shown in FIGURE 1D. Transfer of the third binary to its second stable state would, in turn, cause transfer of the first binary to its first stable state as shown in FIGURE 1E and so forth to provide the six stable states shown. Repeated transfer through the six stable states will continue until the application of a stop-pulse to the device as hereinafter described. Additional stable states can be obtained merely by the use of additional binaries.

Figures 2, 3:
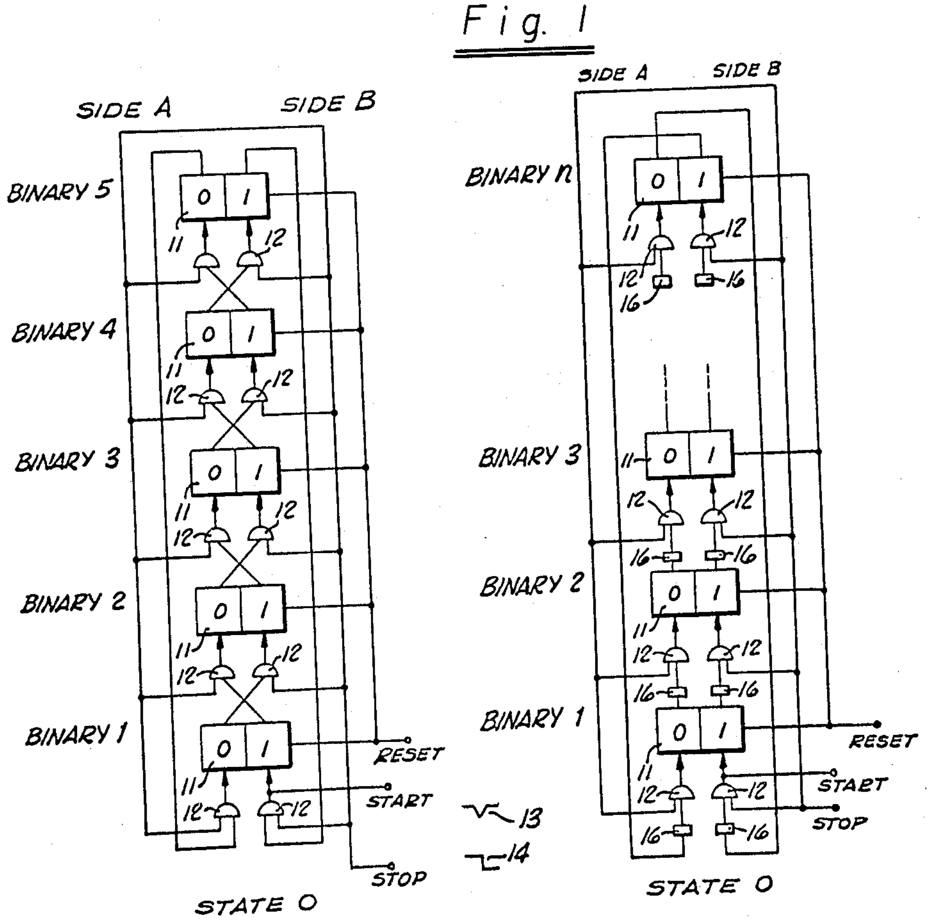
FIGURE 2 is a more detailed block diagram embodying my invention utilized as a device for time interval measurement.
FIGURE 3 is a block diagram similar to that shown in FIGURE 2 with the exception that phase inverting means is included.

A more detailed description of how my multi-stable state circuit operates when utilizes as a device for making short time interval measurements may be seen with reference to FIGURE 2. In the embodiment shown in FIGURE 2, five binaries 11 are utilized for making the device particularly useful for decimal time interval measurements. Each of the binaries is shown as having two sides, side A and side B. Each of the binaries also has two inputs and two ouputs as shown in the drawings. The two inputs of each of the binaries are connected to two gates 12 which control the application of pulses or signals to the binaries. The binaries are connected serially or in cascade and into a closed loop with the outputs of the last binary being connected to the inputs of the first binary. It will be noted, however, that the outputs of the binaries are connected to the opposite sides of the succeeding binaries because of the phase inversion which takes place within the binaries themselves as hereinafter explained.

When the binaries in the block diagram in FIGURE 2 are in a reset or state zero position, all the binaries are in the same stable state, that is, with sides B conducting as shown in the diagram. The gates connecting the outputs of the preceding binaries to the inputs of the succeeding binaries are all on or open. When a start pulse 13 such as that shown in FIGURE 2 is applied to the start terminal, the first binary is shifted from its present or first stable state to its other or second stable state or in other words, side B is made nonconducting and side A is made conducting. Binary 1 is connected to binary 2 in such a manner that when binary 1 is shifted to its other stable state, binary 2 is shifted to its other stable state. Shifting binary 2 to its other stable state causes binary 3 to be shifted to its other stable state and this continues until all five binaries are in the other stable state, that is, with all of the side A's conducting and all of the side B's nonconducting. Shifting of binary 5 to its other stable state causes the binary 1 to be shifted to its original state. This free-running action continues until a stop pulse 14 is applied to the stop terminal in FIGURE 2. The application of a stop pulse turns all of the gates off or closed to prevent the triggering of the next binary. The binaries, therfore, remain in the stable states they were in at the time of application of the stop pulse. Conventional readout devices can then be used to indicate the last stable state of multi-stable state device. The device can be reset in a conventional manner through the reset terminal.

Specifically, when a start pulse is applied to the first binary to turn the on side to off and the off side to on, the turning of the off side to on produces an output which is applied to the on side of the second binary to turn it to off. Turning the on side to off of the second binary causes the off side to be turned on which produces an output which causes the "on" side of the third binary to be turned off. This operation continues until a stop pulse is applied to the circuitry as hereinbefore explained.

It will be noted that in FIGURE 2, five binaries have been utilized which adapts it particularly for decimal time interval measurements. It will be appreciated, however, that any desired number of stages can be utilized.

Figure 4:
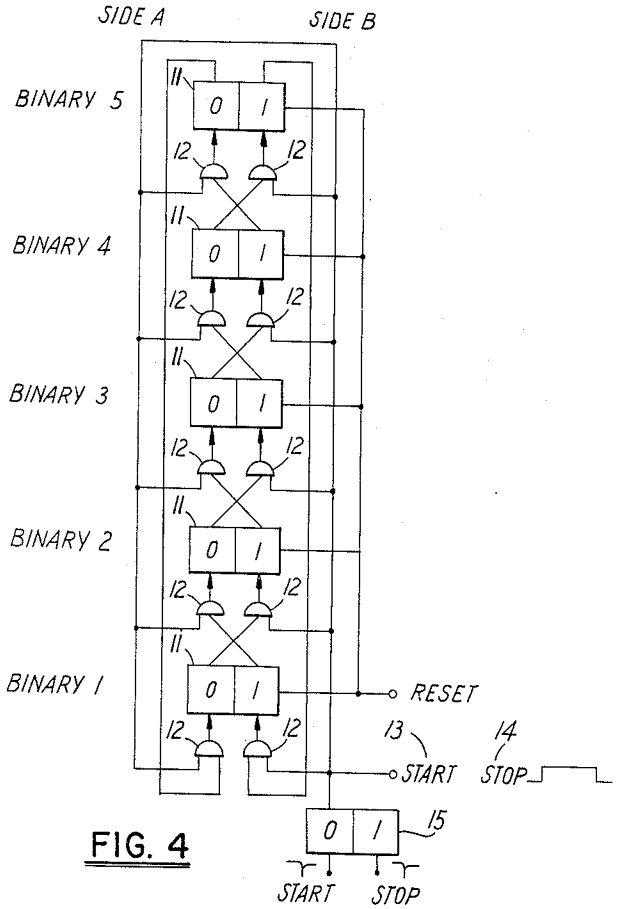
FIGURE 4 is a block diagram illustrating a modification of the device for time interval measurements shown in FIGURE 2.

A modification of the time interval device disclosed in FIGURE 2 is shown in FIGURE 4. It is similar to the embodiment shown in FIGURE 2 with the exception that it is not provided with separate start/stop inputs. A start/stop input pulse is applied to a common start/stop terminal as indicated in the form of a D.C. coupled gating pulse of the type shown in the drawing. The length of the gating pulse represents the time interval to be measured. Alternatively, the gating pulse can be supplied by a binary 15 which can be turned on and off by separate start and stop pulses as also indicated in FIGURE 4.

The device in FIGURE 4 is started in its operation when the AND gates 12 are activated or turned on. This start pulse can be supplied by the gate binary 15 by the application of a start pulse to the binary 15. Once the device for time interval measurement has been started, it will go through ten discrete steps in the manner hereinbefore described for FIGURE 2 before it provides an output pulse and then will keep on oscillating until it is stopped in one of its stable states by a termination of the signal on the start-stop line to deactivate or turn the AND gates 12 off. This signal on the start-stop line alternatively can be terminated by the application of a pulse to the stop line of the gate binary 15.

From the foregoing, it can be seen that the time interval device serves as its own oscillator, gate, count-down and memory unit. It can be called a digital oscillator because it runs in digital steps.

Also, from the foregoing operation, it can be seen that all of the binaries are turned on in succession before any binary is turned off, and then all are turned off in succession before any binary is turned on.

My device for time interval measurement is always synchronized with the start pulse. This is true because the digital oscillator starts its oscillation precisely in synchronism with the start signal and for that reason "*n*" units of time interval measures exactly "*n*" at all times. Thus, it can be said that the digital oscillator is phase locked with the start pulse which capability makes it possible to quantize with extreme accuracy. For example, a known time delay can be added to an unknown until the digital oscillator switches to the next digit. By interpolation, time intervals can be measured very accurately e.g. with resolution in the picosecond range. This phase locked operation of the digital oscillator is particularly advantageous when multiple time intervals are being measured. Thus, any number of time interval measuring devices can be utilized in parallel without the usual problem in synchronizing their time bases. The time interval measuring devices run synchronized automatically.

The operation of the embodiment shown in FIGURE 3 is very similar to that of the multi-stable device shown in FIGURE 2. N binaries have been utilized as indicated by the last binary. Phase inverting devices 16 have been provided at each output of the binaries to create phase inversion in the output signals of the binaries. This is to compensate for the phase inversion between the inputs and the outputs of the same sides of the binaries. Thus, in place of the crisscross connections utilized in FIGURE 2 vertical in-line connections are made. When connected in the manner shown in FIGURE 3, when an on side is switched to off, an output signal is supplied to the "on" side of the succeeding stage to cause it to be switched from "on" to "off" and to cause the other side to be switched from off to on. This same sequence is repeated as the other binaries are switched.

The circuitry of FIGURE 3 is advantageous because it makes possible higher speed operation. The higher speed operation occurs because the triggered side output waveform of the binary is utilized by the phase inverter to trigger the next stage rather than the opposite side output waveform. This is true because the triggered side output waveform follows the trigger pulses more rapidly than the opposite side output waveform.

Figure 5:
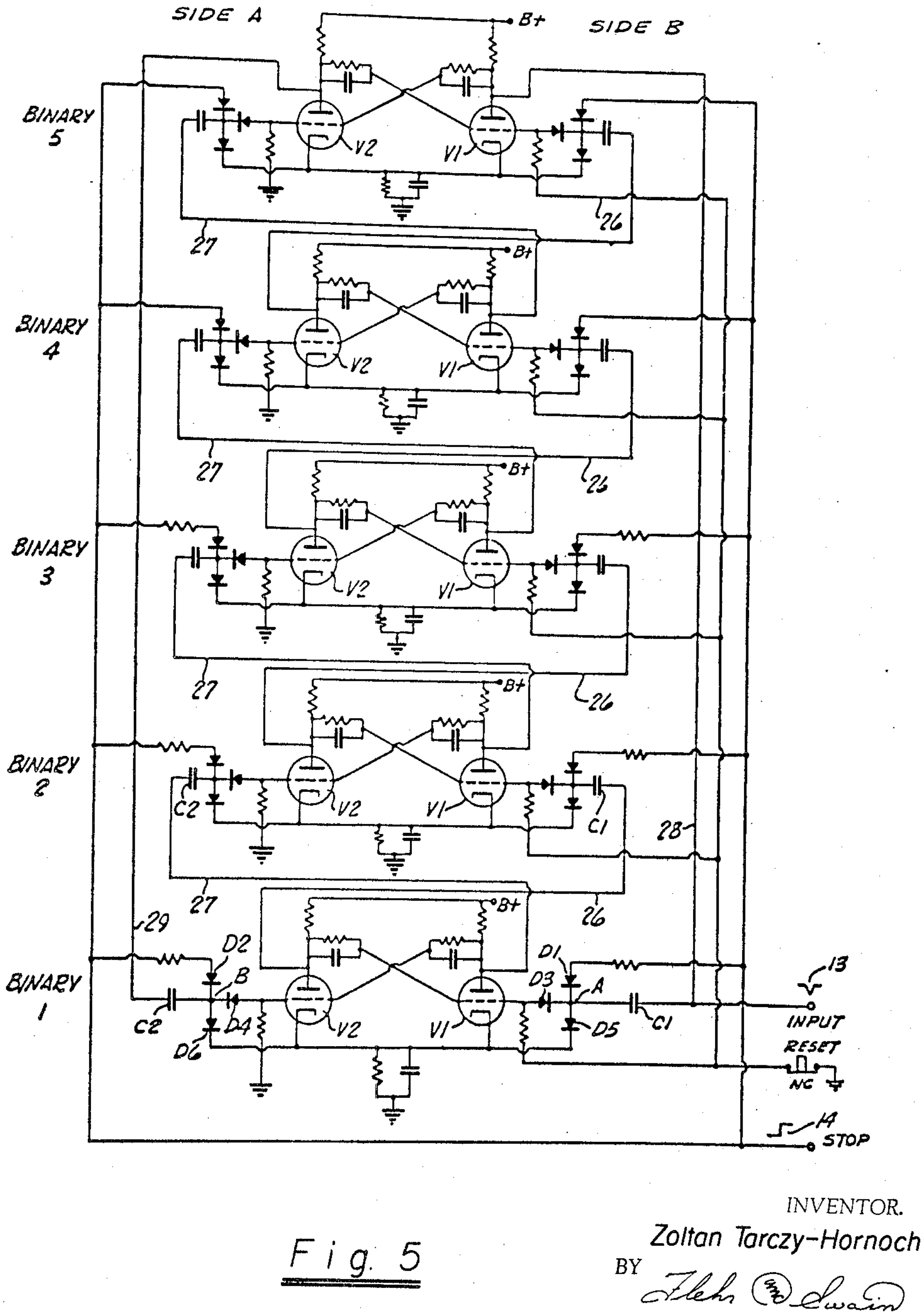
FIGURE 5 is a detailed circuit diagram of a plurality of binaries connected in the manner shown in block diagram in FIGURE 2 to provide a free running multi-stable state device suitable for time interval measurements.

In FIGURE 5 I have shown a typical detailed circuit diagram of a plurality of binaries connected in the manner shown in the block diagram in FIGURE 2 to provide a free running multi-stable state device suitable for time interval measurements. The binaries utilized in FIGURE 5 are substantially conventional and are of a type well known to those skilled in the art. Each of the binaries consists of a pair of suitable non-linear active devices such as vacuum tubes, transistors, tunnel diodes, or other semiconductor devices. In FIGURE 5 vacuum tubes $V_1$ and $V_2$ are utilized and are connected in such a manner that the output of one is fed back to the input of the other to provide an arrangement which is commonly known as a flip-flop or a binary circuit.

In the circuit diagram shown in FIGURE 5, five binaries of the above type are utilized and are numbered binaries 1 to 5. Because ordinarily a negative going pulse can only be used to switch a vacuum tube flip-flop from one stable state to the other, a criss-cross arrangement is utilized for connecting the binaries. Thus, the plate of tube $V_2$ is connected to the grid of the tube $V_1$ of binary 2 by a conductor 26 and a diode gate and the tube $V_1$ is connected to the grid of the tube $V_2$ by a conductor 27 and a diode gate. The succeeding binaries are connected in the same way so that it can be said that they are serially connected or connected in cascade. The last binary in the cascade has its outputs connected to the inputs of the first binary by the conductors 28 and 29 and their respective diode gates to provide a closed loop.

Operation of the circuitry shown in FIGURE 5 may now be described briefly as follows: When a negative input pulse 13 is applied to Binary 1, Binary 1 is switched from one stable state to the other stable state, that is, tube $V_1$ is rendered nonconducting and tube $V_2$ is rendered conducting. The negative going signal from the output of tube $V_2$ as it begins conducting is applied to the input gird of tube $V_1$ of Binary 2 to switch Binary 2 from one stable state to the other stable state. The negative going pulse from the switching of the Binary 2 is utilized for switching Binary 3. This is the same sequence which continues through Binaries 4 and 5. Switching of Binary 5 causes a negative going pulse to be applied through conductor 29 to the grid of tube $V_2$ to switch Binary 1 to its original stable state by making tube $V_2$ nonconducting and tube $V_1$ conducting. This sequence of operation continues to provide what may be called a free running digital oscillator.

Free running of the multi-stable state circuit continues until a stop pulse or waveform 14 is applied to the stop terminal to signify determination of the interval of interest. All of the diode gates (D1, D3 and D5 for one side and D2, D4 and D6 for the other side) are cut off by the stop waveform 14 so that a negative pulse cannot be received by the next stage. The multi-stable circuit is maintained in the condition in which it was found when the stop pulse was applied to the circuit. When the multi-stable state device is free running, the stop waveform 14 is at a low potential level so that the diodes D1 and D2 of the diode gate are nonconducting. When a stop pulse is applied to cause conduction of the diodes D1, D2, D5 and D6, the current flow past junctions A and B will prevent the application of a negative pulse to any of the binary stages of the multi-stable state device. The diodes D3 and D4 are used as conventional disconnecting diodes.

Figure 6:
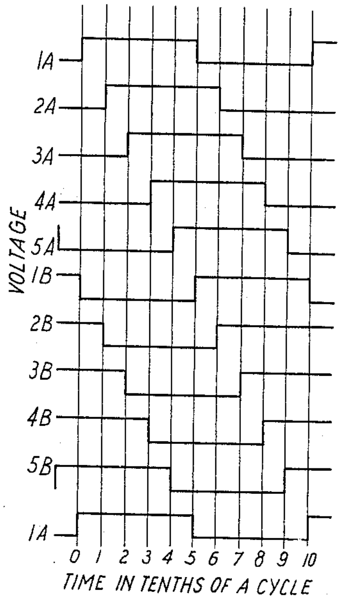
FIGURE 6 is a graph showing the voltage-time curves of the circuit shown in FIGURE 5.

Typical waveforms of the circuit shown in FIGURE 5 are shown in FIGURE 6. As can be seen from FIGURE 6, curve 1A which represents the output voltage of tube $V_1$ of binary 1 starts its cycle at zero, whereas curve 2A which represents the output voltage of the tube $V_1$ of binary 2 starts its cycle one-tenth of a cycle later. This continues through the curve 5A which represents the output voltage of the tube $V_1$ of binary 5. Thereafter, the other sides of the binaries are rendered conducting and the output curved 1B through 5B are produced by the tubes $V_2$ of the binaries, after which the same sequence is repeated beginning with the curve 1A. This type of operation continues until stopped as hereinbefore described.

Thus, the circuit is free running or oscillates continuously in a digital manner. Each binary stage operates at the same speed and each stage switches the succeeding stage to provide a multi-stable state circuit which operates much more rapidly than conventional binary chains. A circuit having $2n$ stable states can be accomplished very easily using $n$ number of stages. A ten stable state circuit has been shown because it would be one of the most useful circuits in digital time interval measuring.

The resolution of my multi-stable circuit is much greater than that of conventional gated binary chains because the recovery time of each of the binaries is not a limiting factor. A binary can switch a succeeding stage in a much shorter time than it can be switched a second time. For a binary to be switched a second time, an interval of time is required which includes the following times—a delay time for charging up the capacities of the circuit before switching occurs, the time required for regeneration and switching, and then the time required for recovery or dead time until the circuit assumes its original sensitivity so that it can receive a second pulse, or in other words, capable of being switched a second time. These times, therefore, determine the resolution of the binary.

When binaries are connected in the manner shown in FIGURE 5, the succeeding binary is triggered as soon as the switching waveform of the previous binary reaches a level sufficient to trigger the succeeding binary. The succeeding binary is in its original undisturbed state and is at its full sensitivity. On the other hand, at the same instant of time, the tube to which the start pulse had been applied is at maximum insensitivity and remains in this insensitive condition for a long perod of time determined by the recovery time of the circuit. The succeeding binary can be switched in a very short time after the preceding binary has been switched in comparison to the recovery time for the preceding binary. At a certain time during the switching time such as the half-way point in the switching time, it is possible to start triggering the succeeding stage. Therefore, it is possible to save all of the recovery time and a portion of the switching time. However, it is not possible to eliminate the triggering time or a portion of the switching time.

It is, therefore, apparent that during the triggering of the succeeding binary stages, the preceding binaries are given sufficient time to complete the switching and to recover. Thus, in the circuit shown in FIGURE 5, the first binary triggered has time to recover while the four succeeding binaries are triggered.

Figure 7:
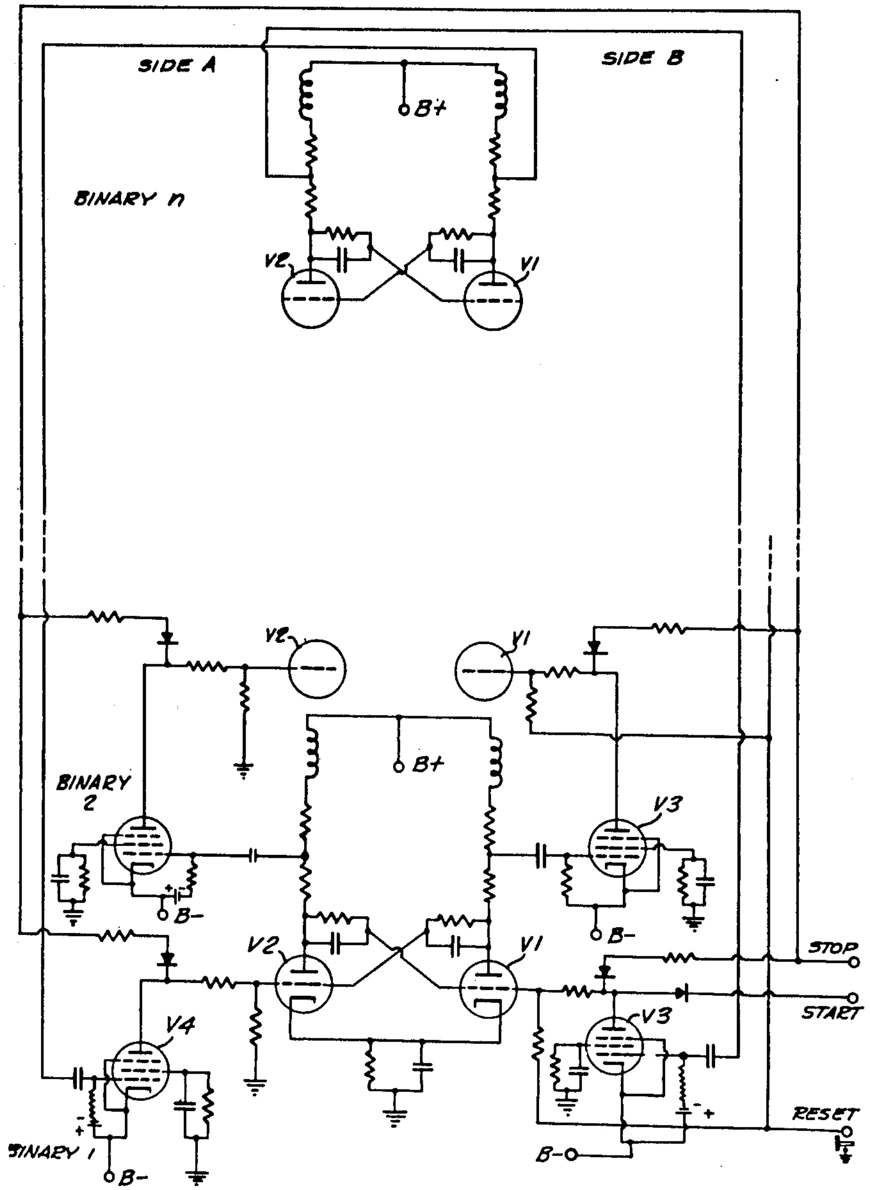
FIGURE 7 is a detailed circuit diagram showing a plurality of binaries connected in the manner shown in block diagram form in FIGURE 3.

Another embodiment of my invention is shown in FIGURE 7 in which a plurality of binaries are connected in the manner disclosed in block diagram form in FIGURE 3. The binaries are numbered 1 through $n$ and indicate that any number of binaries can be utilized. It will be noted that each of the binaries had a marked similarity to the binaries shown in FIGURE 5. Additional phase inverting circuitry for each of the binaries is provided and can be in any suitable form such as the tubes $V_3$ and $V_4$ shown. Other phase inverting devices such as transformers or transistor circuitry can be used.

When a start pulse is applied to the start terminal, the tube $V_1$ is rendered nonconducting and the tube $V_2$ is rendered conducting. The positive going signal from the output of the tube $V_1$ is applied to the grid of the phase inverting tube $V_3$ which is normally biased beyond cut-off. Application of the positive pulse causes the tube $V_3$ to conduct to cause it to generate a negative going pulse which is utilized for triggering the succeeding binary.

The nature of the binary circuit is such that when a negative pulse is applied to the conducting side of the binary, the resulting switching first produces a positive going waveform at one output and then a succeeding negative going waveform at the other output. Consequently, by inverting the positive going waveform to produce a negative signal with my phase inverting means, it is possible to produce a negative signal sooner than the negative going signal of the binary.

It is readily apparent by utilizing such phase inverting means the criss-cross arrangement shown in FIGURE 5 is not necessary and that the right hand tubes will be successively rendered nonconducting, after which the left hand tubes will be successively rendered nonconducting as the circuitry continues to run freely until a stop pulse is applied in much the same manner as described in conjunction with FIGURE 5.

If slower operation is desired, the gates can include adjustable delay elements such as RC circuits or delay lines. Alternatively, variable biasing can be utilized to delay the trigger point of one or more of the binaries.

The digital oscillators in FIGURES 5 and 7 both advance from state to state after a start pulse has been applied and will be stopped only upon application of a stop pulse. The number of steps will be proportional to the elapsed time. Therefore, the digital oscillators can be used for time interval measurements. If the time interval to be measured is longer than the full cycle of the digital oscillator, then the number of cycles can be counted by conventional decimal counting means.

Using visual or electrical readout devices with such time interval measuring devices is greatly simplified because of the straight decimal arrangement of the multistable state circuit.

Figure 8:
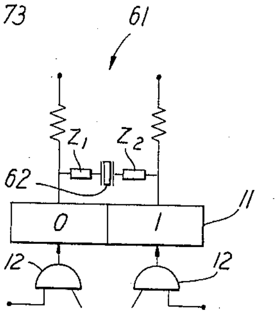
FIGURE 8 is a diagram, partially in block form, of one of the binaries which is crystal-controlled suitable for use in my device for time interval measurements.

Although triodes for binaries, pentodes for phase inverters, and semiconductor diodes for gating were used in conjunction with the circuitry shown in FIGURES 5, 7 and 8, it is readily apparent that other types of tubes, transistors, and other semiconductor devices (all of which are nonlinear active or passive elements) with suitable circuit arrangements may be substituted, if desired.

In order to obtain additional stability when my multistable state circuit is utilized as a digital oscillator, it can be synchronized as shown in FIGURE 8. As hereinafter described, it is only necessary to stabilize one stage. Such a stabilized stage is shown in FIGURE 8. This stage consists of the binary 11 with its gates 12. A crystal timing network 61 is connected to the outputs of the binary 11. This crystal network 61 consists of a crystal 62 and two impedances $Z_1$ and $Z_2$ which are connected in series between the two outputs of the binary 11. The two impedances $Z_1$ and $Z_2$ are provided for tuning and impedance matching purposes.

The operation of such a stage in connection with a complete digital oscillator in which it forms one stage may now be briefly described. Let it be assumed that the crystal network 61 is a quiescent state, that is, the crystal 62 is not oscillating. As soon as the digital oscillator is placed in operation, the binary connected to the crystal network 61 will start oscillation of the crystal 62 to bring it out of its quiescent state. The digital oscillator will then step in its conventional manner and normally by the time that the digital oscillator has gone through one or more cycles, the oscillator network 61 has reached its full amplitude of oscillation. As soon as this point is reached, the crystal network 61 will have a stabilizing effect on the frequency of the digital oscillator. Thus, if the digital oscillator has a tendency to run faster than the crystal frequency, the crystal will have a retarding or holding-back effect on the switching speed of the binary to which it is connected. On the other hand, if the digital oscillator is running too slow, the crystal 62 will have an opposite effect so that the digital oscillator will operate at substantially the resonant frequency of the crystal network. It is readily apparent that if desired in place of the crystal network any high Q device such as a resonant cavity or an LC network can be used in one or more of the stages.

In the arrangement shown in FIGURE 8, the crystal network 61 is connected into the binary 11 without additional amplification. Because of this fact, the Q of the crystal is lowered by loading effect of the binary so that the use of such a circuit will not provide high stability frequency control if that is desired. The use of a crystal network 61, as shown in FIGURE 8 however, will stabilize the binary and, therefore, the digital oscillator. This is true because when one of the binaries in a chain is stabilized, the remainder of the binaries will automatically readjust themselves and will keep running at the controlled frequency provided by the crystal. This is advantageous because it is only necessary to utilize a crystal having a frequency equal to the switching frequency of the binary which would only be a fraction of the stepping frequency of the digital oscillator.

Figure 9:
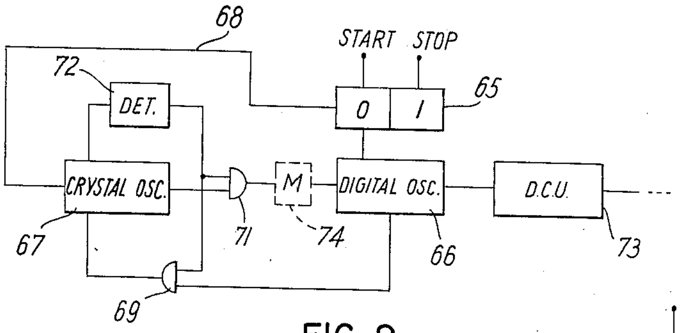
FIGURE 9 is a block diagram of a frequency stabilized time interval measuring device.

When it is desired to obtain still more precise frequency control, a circuit of the type shown in FIGURE 9 can be utilized. Separate start and stop lines have been provided for the digital oscillator but, as hereinbefore explained, a single start-stop line can be provided if desired. The control binary 65 is also connected to a crystal oscillator 67 by line 68. The output of the digital oscillator is connected to the crystal oscillator 67 through an inhibit gate 69. The crystal oscillator is connected to the digital oscillator through an AND gate 71. A detector 72 is connected to the output of the oscillator 67 and is connected to the AND gate 71 and to the inhibit gate 69. The output of the digital oscillator is connected to other decimal counting units 73. The AND and inhibit gates are preferably linear (proportional) gates.

Operation of this embodiment of my invention may now be briefly described as follows. Let it be assumed that the crystal oscillator 67 is in a quiescent condition. When a start pulse is applied to the digital oscillator, the digital oscillator will begin stepping in the manner hereinbefore described. The start pulse will also be applied from the binary 65 to the crystal oscillator 67 to start it oscillating. At the beginning of its oscillation, the output amplitude of the oscillator is very small but the amplitude gradually increases until the output of the oscillator reaches full amplitude. During the time that the crystal oscillator is reaching full amplitude, the output of the digital oscillator will be supplied to the crystal oscillator through the inhibit gate 69 which, at this time, is not inhibited. Thus, during the build-up of the oscillation in the crystal oscillator, the phase of the oscillations of the crystal oscillator is determined by the phase of the output pulses from the digital oscillator which, in turn, are controlled by the phase of the start pulse utilized for starting operation of the digital oscillator 66.

As the amplitude of the oscillations in the crystal oscillator 67 build up, the output is sensed in the detector 72 and supplied to the AND gate 71 and to the inhibit gate 69. As the amplitude increases the output from the crystal oscillator will be supplied to the digital oscillator through the AND gate 71 with increasing amplitude. At the same time, the inhibit gate 69 will gradually inhibit the application of any further pulses from the digital oscillator to the crystal oscillator 67. With this arrangement, there is gradual phasing in of the oscillations from the crystal oscillator and a phasing out of the pulses from the digital oscillator. Thus, it can be seen that when the crystal oscillator 67 comes up to its normal amplitude, it will control the frequency of the digital oscillator 66.

The crystal oscillator can be connected into the digital oscillator 66 and the frequency of the crystal oscillator 67 can be chosen so that it can be synchronized to one or more of the binaries of the digital oscillator, or it can be synchronized to the stepping frequency of the digital oscillator. By the use of a multiplier 74 which is shown in dotted lines, it is possible to utilize a crystal which has a much lower frequency than that which is required in the digital oscillator. It should be kept in mind that crystals having the highest stability have more energy stored in them, and for that reason, require additional time to reach full stability. For that reason, with the circuitry shown, a digital oscillator would have to rely on its own frequency for a longer period of time before it would become synchronized to the frequency of the crystal oscillator.

From the foregoing arrangement, it can be seen that with the circuitry I have shown, I have made it possible to utilize the phase of the digital oscillator which is determined by the phase of the start pulse, while at the same time, making it possible to obtain the frequency stability which is possible with the use of a crystal controlled oscillator. The circuitry can be somewhat simplified if it is not necessary to retain this phase locking principle. For example, if desired, a continuously running crystal oscillator could be used. In such an embodiment, the digital oscillator would be started by the start pulse when the start pulse was in phase with the crystal oscillator. However, in such a case, the digital oscillator would not be phase locked to the start pulse regardless of when the start pulse arrived. In order to retain this phase locking principle, it is necessary that the crystal oscillator must not be oscillating at the time that the start pulse is applied.

As hereinbefore explained, in the embodiment shown in FIGURE 9, the crystal oscillator is first phase locked to the digital oscillator and then the digital oscillator is frequency locked to the crystal oscillator. In this way, the best features of the crystal oscillator and the digital oscillator are used. Thus, the digital oscillator controls the phase and the crystal oscillator controls the frequency.

Figure 10:
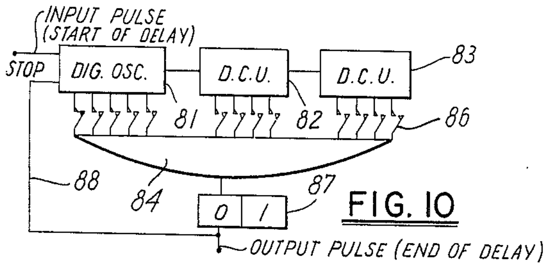
FIGURE 10 is a block diagram of a digital delay generator.

A digital delay generator is shown in FIGURE 10. It generates an output pulse a preset number of time intervals after an input pulse is received. The digital delay generator consists of a digital oscillator 81 of the type hereinbefore described which has its output connected to one or more decimal counting units, for example, decimal counting units 82 and 83 as shown in FIGURE 10. The digital oscillator is provided with five output lines, one for each of the five binaries assuming that five binaries are being used whereas the decimal counting units 82 are provided with four outputs each, one for each of the four binaries normally utilized in a decimal counting unit. These outputs are adapted to be connected to a multiple AND gate 84 by suitable switch means 86 which, for example, can take the form of diode gates. Alternatively a plurality of AND gates can be used in place of the single AND gate.

When an input pulse is applied to the input line of the digital oscillator which represents the start of the delay, the digital oscillator starts its free running action and drives the subsequent digital counting units 82 and 83. Certain of the switches 86 are closed to represent the preset number of time intervals to be countered. When this number has been counted the AND gate 84 will give an output signal which will switch a binary 87 which will in turn provide an output pulse that signifies the end of the time delay. This output pulse is also connected by a line 88 to the digital oscillator to stop the oscillator at the end of the delay period. From the foregoing it can be seen that the digital delay generator after being started by an input pulse which represents the start of the time delay can produce an output pulse after a predetermined precise time delay.

It is apparent from the foregoing that I have provided a new and improved multi-stable state circuit which has many possible applications such as for time interval measurements or digital delay generation. The circuitry is arranged in such a manner that the resolution is increased greatly in comparison with conventional circuitry used for the same purpose.

I claim:

1. In a multi-stable state circuit, a plurality of binaries, each of the binaries having two inputs and two outputs, a pair of gates coupled with each binary and connected to said two inputs of the binary, means connecting said two outputs of each of said binaries to the pair of gates coupled to the succeeding binary to thereby connect the binaries into a closed series loop, means for applying a start pulse to one of the inputs of one of the binaries, the binaries being connected through said gates so that when said one binary is triggered by the start pulse, the succeeding binaries are always triggered in succession to provide a free running action, and means for applying a stop pulse to all of the gates simultaneously to stop said free running action.

2. A multi-stable state circuit as in claim 1 wherein each of said binaries is comprised of two non-linear active elements, one of the non-linear active elements being conducting and the other being substantially nonconducting in the one stable state, said one non-linear active element being substantially nonconducting and said other non-linear active element being conducting in the other stable state, the output wave form from each binary during switching of the binary from one stable state to the other stable state always being utilized to trigger the succeeding binary to cause the succeeding binary to switch from one stable state to the other stable state, the preceding binary remaining in said other stable state for a predetermined interval of time after the succeeding binary has been switched.

3. A multi-stable state circuit as in claim 1 wherein each binary consists of two non-linear active elements, one non-linear active element being conducting and the other non-linear active element being substantially nonconducting when the binary is in one stable state, said one non-linear active element being substantially nonconducting and said other non-linear active element being conducting in the other stable state, each binary producing a waveform when switching from one stable state to the other, and phase inverting means for converting the waveform pulse into an opposite-going waveform for triggering the succeeding binary, the preceding binary remaining in said other stable state for a predetermined period of time after the succeeding binary has been switched.

4. In a multi-stable state circuit, a plurality of binaries, each of the binaries having two sides, each side of each of the binaries having an input and an output, a pair of gates coupled with each binary and connected to said inputs of the binary, means connecting the outputs of each binary to the gates of a succeeding binary to thereby connect the binaries into a closed series loop, means for applying a start pulse to one side of one of the binaries to trigger said one binary, the binaries being connected by the connecting means so that when said one binary is triggered by the input pulse, the succeeding binaries are triggered in succession to provide a free-running action, and means for applying a stop pulse to all of the gates simultaneously to stop said free-running action.

5. In a free running digital oscillator a plurality of binaries arranged from first to last, each of the binaries having two sides with an input and an output connected to each side, a gate connected to each input of each of the binaries, circuit means connecting the outputs of the last binary to gates connected to the corresponding inputs of the first binary, circuit means connecting the outputs of the other binaries to the gates on opposite sides of the succeeding binaries to connect the binaries into a closed series loop, means for applying a start pulse to one of the inputs of one of the binaries, the binaries being connected through the gates so that when one of the binaries is triggered by the input pulse, the succeeding binaries are triggered in succession to provide a free-running action, and means for applying a stop pulse to all of the gates simultaneously to stop said free-running action.

6. In a free running digital oscillator a plurality of binaries arranged from first to last, each of the binaries having two sides with an input and an output connected to each side, a gate connected to each input of the binaries, circuit means connecting the outputs of the last binary to the gates on the opposite sides of the first binary, circuit means connecting the outputs of the other binaries to the gates on the same sides of the succeeding binaries to connect the binaries into a closed series loop, said last named circuit means including phase inverting means, means for applying a start pulse to one of the inputs of one of the binaries, the binaries being connected through the gates so that when one of said binaries is triggered by the start pulse, the succeeding binaries are always triggered in succession to provide a free running action, and means for applying a stop pulse to all of the gates simultaneously to stop said free running action.

7. In a multi-stable state circuit, a plurality of binaries arranged from first to last, each of the binaries having two sides with an input and an output connected to each side, a gate connected to each input of each of the binaries, means connecting the outputs of the binaries to the gates to connect the binaries into a closed series loop so that they are all turned on in succession before any binary is turned off and then all turned off in succession before any binary is turned on, means for applying a start pulse to one of the gates connected to the inputs of one of the binaries to trigger said one binary, the binaries being connected so that when one binary is triggered by the start pulse, the succeeding binaries are each triggered in succession by the preceding binaries to provide a continuous free running action of the binaries, and means for applying a stop pulse to all the gates simultaneously to halt said free running action of the binaries.

8. A circuit as in claim 7 wherein the start pulse is applied to all of the gates simultaneously.

9. A circuit as in claim 7 wherein the means for applying the start pulse and the means for applying a stop pulse includes a common conductor connected to all of the gates.

10. A circuit as in claim 9 together with an additional binary connected to said common conductor and means for applying separate start and stop pulses to said additional binary.

11. In multi-stable state circuit for time interval measurements, a plurality of trigger circuits, the trigger circuits being capable of assuming two stable states, means connecting the trigger circuits into a closed series loop so that as one of said trigger circuits changes its state, the succeeding trigger circuits change their states in succession to provide a continuous free running action of the trigger circuits in which said trigger circuits assume one of said states in succession before any of the trigger circuits assume the other stable state and then assume said other stable state in succession before any trigger circuit assumes said one stable state, means for causing said one trigger circuit to change its state to commence said free running action, means coupled to all of said trigger circuits for stopping said free running action and means coupled to said trigger circuits for providing a readout.

12. In a digital oscillator, a plurality of binaries arranged from first to last and having first and second sides with each side being capable of assuming a conducting or nonconducting condition, each side of the binary having an input and an output, a gate connected to each input, means connecting the outputs of the first and second sides of the last binary to the gates connected to the first and second sides of the first binary, means connecting the outputs of the first and second sides of the other binaries to the gates connected to the inputs of the succeeding binary, so that all of said binaries are connected in a closed series loop whereby when one of said binaries is triggered the succeeding binaries are each triggered in succession to provide a continuous free running action, means for causing said one binary to trigger at the commencement of the time interval to be measured, means connected to all of the gates to stop the free running action at the end of the time interval to be measured, and means for resetting the binaries, the binaries in a reset condition having the same side of each of the binaries conducting.

13. A digital oscillator as in claim 12 wherein the outputs of the first and second sides of the last binary are connected through the gates to the corresponding sides of the first binary and wherein the outputs of the first and second sides of the other binaries are connected through the gates to the second and first sides respectively of the succeeding binary.

14. A digital oscillator as in claim 12 wherein the outputs of the first and second sides of the last binary are connected through the gates to the second and first sides of the first binary and wherein the outputs of the first and second sides of the other binaries are connected to the corresponding sides of the succeeding binary and wherein the means connecting the outputs of the first and second sides of the other binaries includes phase inversion means.

15. A digital oscillator as in claim 12 wherein said gates are active gates.

16. A multi-stable state circuit as in claim 11 together with frequency stabilization means for stabilizing the frequency of the multi-stable state circuit, said frequency stabilizing means including a resonant circuit connected to at least one of the trigger circuits.

17. A multi-stable state circuit as in claim 11 together with frequency stabilization means for stabilizing the frequency of oscillation of the multi-stable state circuit, said frequency stabilization means consisting of a crystal oscillator, gate means for connecting the crystal oscillator to the multi-stable state circuit, additional gate means connecting the multi-stable state circuit to the crystal oscillator, means for supplying the output of the crystal oscillator to the first named and additional gate means, and means connected to said crystal oscillator for starting the operation of said crystal oscillator when said one trigger circuit is caused to change its state to commence said free-running action.

18. A multi-stable state circuit as in claim 11 together with frequency stabilization means for stabilizing the frequency of oscillation of the multi-stable state circuit, said frequency stabilization means consisting of a crystal oscillator, "and" gate means for connecting the crystal oscillator to the multi-stable state circut, additional "and" gate means connecting the multi-stable state circuit to the crystal oscillator, means for detecting the output of the crystal oscillator and supplying the same to the first named and additional "and" gate means and means connected to said crystal oscillator for starting the operation of said crystal oscillator when said one trigger circuit is caused to change its state to commence said free running action.

19. In a circuit of the character described, a digital oscillator having a plurality of stable states inter-connected to provide a continuous free-running action between the stable states, a crystal oscillator, gate means connecting the output of the digital oscillator to the crystal oscillator, additional gate means connecting the output of the crystal oscillator to the digital oscillator, detector means connecting the output of the digital oscillator and to the first named and additional gate means, means connected to the digital oscillator and the crystal oscillator for causing said digital oscillator to commence its free-running action and to start oscillation of said crystal oscillator in unison, the digital oscillator starting in phase with the phase of the start pulse and supplying its output to the crystal oscillator through the first named gate means so that the crystal oscillator oscillates in phase with the start pulse, the output of the crystal oscillator gradually building up in amplitude to its full amplitude, said first named gate means gradually inhibiting the transmission of pulses from the digital oscillator to the crystal oscillator as the output amplitude of the crystal oscillator increases, said additional gate means supplying an increasing amount of the output of the crystal oscillator to the digital oscillator so that the frequency of the digital oscillator is controlled by the crystal oscillator.

References Cited by the Examiner

UNITED STATES PATENTS

| | | | |
|---|---|---|---|
| 2,416,095 | 2/1947 | Gulden | 328—43 |
| 2,738,461 | 3/1956 | Burbeck | 324—68 |
| 2,787,416 | 4/1957 | Hansen | 328—37 |
| 3,039,685 | 6/1962 | Bagley et al. | 324—68 |
| 3,105,195 | 9/1963 | Tarczy-Hornoch | 328—43 |

WALTER L. CARLSON, *Primary Examiner.*

FREDERICK M. STRADER, *Examiner.*